(12) United States Patent
Arakawa et al.

(10) Patent No.: US 9,122,787 B2
(45) Date of Patent: *Sep. 1, 2015

(54) METHOD AND APPARATUS TO UTILIZE LARGE CAPACITY DISK DRIVES

(75) Inventors: Hiroshi Arakawa, Sunnyvale, CA (US); Akira Yamamoto, Kanagawa (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,223

(22) Filed: Sep. 14, 2012

(65) Prior Publication Data

US 2013/0007509 A1 Jan. 3, 2013

Related U.S. Application Data

(63) Continuation of application No. 12/561,500, filed on Sep. 17, 2009, now Pat. No. 8,285,952.

(51) Int. Cl.
*G06F 12/00* (2006.01)
*G06F 11/34* (2006.01)
*G06F 11/10* (2006.01)
*G06F 11/16* (2006.01)
*G06F 11/20* (2006.01)

(52) U.S. Cl.
CPC ........ *G06F 11/3485* (2013.01); *G06F 11/1088* (2013.01); *G06F 11/1662* (2013.01); *G06F 11/2082* (2013.01); *G06F 2211/1057* (2013.01)

(58) Field of Classification Search
CPC ............ G06F 11/1088; G06F 11/1662; G06F 11/2082; G06F 11/3485
See application file for complete search history.

(56) References Cited

U.S. PATENT DOCUMENTS

| | | | |
|---|---|---|---|
| 5,517,632 A | 5/1996 | Matsumoto et al. | |
| 7,334,083 B2 * | 2/2008 | Doi | 711/113 |
| 7,386,758 B2 | 6/2008 | Kitamura | |
| 2003/0131206 A1 | 7/2003 | Atkinson et al. | |
| 2005/0193248 A1 | 9/2005 | Idei et al. | |
| 2006/0218211 A1 * | 9/2006 | Shikama et al. | 707/205 |
| 2008/0091741 A1 | 4/2008 | Zohar et al. | |
| 2008/0120459 A1 | 5/2008 | Kaneda et al. | |
| 2009/0125680 A1 * | 5/2009 | Ninose et al. | 711/114 |

FOREIGN PATENT DOCUMENTS

| | | |
|---|---|---|
| JP | 06-075708 A | 3/1994 |
| JP | 11-024850 A | 1/1999 |
| JP | 2005-242403 A | 9/2005 |
| JP | 2008-130080 A | 6/2008 |

* cited by examiner

*Primary Examiner* — Aracelis Ruiz
(74) *Attorney, Agent, or Firm* — Mattingly & Malur, PC

(57) ABSTRACT

A method of utilizing storage in a storage system comprises prioritizing a plurality of storage areas in the storage system for data recovery with different priorities; and performing data recovery of the storage system at an occurrence of a failure involving one or more of the storage areas in the storage system based on the priorities. Data recovery for one storage area having a higher priority is to occur before data recovery for another storage area having a lower priority in the storage system. In various embodiments, the prioritization is achieved by monitoring the access characteristics, or the priority is specified by the host or management computer based on the usage and/or importance of data stored in the storage system, or the priority is determined by the storage system based on the area assignment/release (i.e., usage) of thin provisioned volumes.

20 Claims, 18 Drawing Sheets

| TPV ID | Segment ID | Assigned | Pool Volume ID | Chunk ID |
|---|---|---|---|---|
| 0 | 0 | Yes | 12 | 56 |
|  | 1 | No | - | - |
|  | 2 | Yes | 230 | 29 |
|  | : |  |  |  |
| 1 | 0 | Yes | 31 | 77 |
|  | 1 | Yes | 22 | 90 |
|  | 2 | No | - | - |
|  | : |  |  |  |
| : |  |  |  |  |

Fig. 4

| Pool Volume ID | Chunk ID | Usage | TPV ID | Segment ID |
|---|---|---|---|---|
| 0 | 0 | In Use | 14 | 35 |
|  | 1 | Free | - | - |
|  | 2 | In Use | 53 | 46 |
|  | : |  |  |  |
|  | 4096 | Free | - | - |
|  | 4097 | Free | - | - |
|  | : |  |  |  |
| : |  |  |  |  |
| 100 | 0 | In Use | 24 | 54 |
|  | 1 | In Use | 32 | 74 |
|  | 2 | Free | - | - |
|  | : |  |  |  |
| : |  |  |  |  |

Fig. 5

| Volume ID | Type | Size (GB) | Internal Volume ID | TPV ID | Segment Size (MB) |
|---|---|---|---|---|---|
| 0 | Conventional | 100 | 17 | - | 16 |
| 1 | Conventional | 200 | 45 | - | 4 |
| 2 | TPV | 100 | - | 12 | 2 |
| 3 | TPV | 200 | - | 32 | 4 |
| 4 | Conventional | 150 | 22 | - | - |
| : | | | | | |

| TPV ID | Segment Group ID | Read / Write | Access rate per unit time | Last access time | Average access length |
|---|---|---|---|---|---|
| 0 | 0 | Read | 15 | 2008/05/07 22:33:59.992 | 4096 |
| | | Write | 4024 | 2008/05/08 02:26:12.005 | 4096 |
| | 1 | Read | 2305 | 2008/05/08 01:02:10.100 | 1048576 |
| | | Write | 67 | 2008/05/07 23:40:01.090 | 1048576 |
| .. | .. | | | | |

| Conventional volume ID | Conventional Volume Segment ID | Read / Write | Access rate per unit time | Last access time | Average access length |
|---|---|---|---|---|---|
| 0 | 0 | Read | 15 | 2008/05/07 22:33:59.992 | 4096 |
| | | Write | 4024 | 2008/05/08 02:26:12.005 | 4096 |
| | 1 | Read | 2305 | 2008/05/08 01:02:10.100 | 1048576 |
| | | Write | 67 | 2008/05/07 23:40:01.090 | 1048576 |
| .. | .. | | | | |

| TPV ID | Segment ID | Releasable |
|---|---|---|
| 0 | 0 | No |
|  | 1 | No |
|  | 2 | No |
|  | : |  |
| 1 | 0 | Yes |
|  | 1 | Yes |
|  | 2 | No |
|  | : |  |
| : |  |  |

| Priority | Volume ID | Start Address (GB) | Length (GB) |
|---|---|---|---|
| High | 0 | 24 | 12 |
| | 17 | 0 | 8 |
| | : | | |
| Middle | 21 | 1024 | 48 |
| | 42 | 512 | 64 |
| | : | | |
| Low | 53 | 0 | 280 |
| | 35 | 1024 | 320 |
| | : | | |

METHOD AND APPARATUS TO UTILIZE LARGE CAPACITY DISK DRIVES

This application is a continuation of U.S. patent application Ser. No. 12/561,500, now U.S. Pat. No. 8,285,952, filed Sep. 17, 2009, which is incorporated herein by reference in its entirety.

BACKGROUND OF THE INVENTION

The present invention relates generally to storage systems and, more particularly, to methods and apparatuses that utilize large capacity disk drives.

The capacity of a single HDD (Hard Disk Drive) unit provided by HDD vendors is increasing at a rapid rate in the HDD market. The capacity of a SSD (Solid State Disk) unit is also increasing. In order to avoid loss of data due to the failure of a disk unit, most storage systems adopt data protection with redundancy such as mirroring and RAID technology. As disclosed in "A Case for Redundant Arrays of Inexpensive Disks (RAID)" by D. A. Patterson, G. Gibson and R. H. Kats, published in Proc. ACM SIGMOD, pp. 109-116, June 1988, RAID configurations are classified in accordance with so-called RAID levels. RAID4, RAID5 and RAID6 configurations use parity code generated from stored data as redundant information. By using the parity code, data stored in multiple disks in a distributed manner can be reconstructed for an occurrence of a disk failure. In this manner, high data availability is accomplished. In the article, having the same data in multiple disks, so called mirroring, is introduced as one method to protect data and is categorized as RAID1.

U.S. Pat. No. 7,386,758 discloses an Object-based Storage Device (OSD) that uses RAID technology and perform reconstruction of data according to the OSD's information indicating where each object is stored in the OSD.

Because the recovery of data is achieved by copying and/or generating the same data as the data stored in the failed disk, the recovery process needs considerable time. This disk failure causes the following influences from occasion of the disk failure to completion of the recovery: the reduction of possibility to avoid unavailability and data loss due to the reduction of redundancy, and the deterioration of performance due to the load of copying data.

Applying large capacity disk drives causes the lengthening of the above duration because the amount of data to be recovered becomes large in comparison with using traditional small capacity disk drives. Therefore, a disk failure recovery method that aligns to the users' applications and usage is required at present.

BRIEF SUMMARY OF THE INVENTION

Exemplary embodiments of the invention provide a storage system which has the capability to prioritize the location of data to be recovered at the occurrence of a disk failure. In one embodiment, the prioritization is achieved by monitoring the access characteristics such as access frequency. The storage system monitors the access characteristics as usage of data and determines the priority regarding the recovery process according to the statistics. In another embodiment, the priority is specified by the host computer or management computer based on the usage and/or importance of data stored in the storage system. The priority is registered to the storage system by the host computer or management computer. The storage system performs recovery from a disk failure according to the specified priority. In yet another embodiment, the priority is determined by the storage system based on the area assignment/release (i.e., usage) of thin provisioned volumes. Using the above approaches, the area to store data in one disk drive can be classified into multiple priorities and recovery from the failure of the disk can be performed according to the priority. The invention is particularly advantageous when applied to the recovery of data stored in a large capacity disk drive.

In accordance with an aspect of the present invention, a method of utilizing storage in a storage system comprises prioritizing a plurality of storage areas in the storage system for data recovery with different priorities; and performing data recovery of the storage system at an occurrence of a failure involving one or more of the storage areas in the storage system based on the priorities. Data recovery for one storage area having a higher priority is to occur before data recovery for another storage area having a lower priority in the storage system.

In some embodiments, the prioritizing comprises monitoring access characteristics of the storage areas in the storage system; and prioritizing the storage areas in the storage system for data recovery with different priorities based on the monitored access characteristics. The access characteristics comprise at least one of access frequency, access rate, or access interval.

In specific embodiments, the prioritizing comprises assigning the different priorities for the storage areas in the storage system. The different priorities are assigned based on at least one of usage or importance of data in the storage areas. The method further comprises, if the different priorities are assigned based on the usage of data in the storage areas, analyzing the usage of data stored in each of the storage areas to determine the priorities and updating the different priorities for the storage areas in the storage system based on the analyzed usage; and if the different priorities are assigned based on the importance of data in the storage areas, analyzing the importance of data stored in each of the storage areas to determine the priorities and updating the different priorities for the storage areas in the storage system based on the analyzed importance.

In some embodiments, for a storage volume which is a thin provisioned volume, the prioritizing comprises determining the different priorities based on area assignment and release of the thin provisioned volume using information regarding assignation process and information regarding release process for the thin provisioned volume.

In accordance with another aspect of the invention, a storage system comprises a data processor and a memory; a plurality of storage areas which have different priorities for data recovery; and a storage controller which performs data recovery of the storage system at an occurrence of a failure involving one or more of the storage areas in the storage system based on the priorities. Data recovery for one storage area having a higher priority is to occur before data recovery for another storage area having a lower priority in the storage system.

Another aspect of the invention is directed to a computer-readable storage medium storing a plurality of instructions for controlling a data processor to utilize storage in a storage system. The plurality of instructions comprise instructions that cause the data processor to prioritize a plurality of storage areas in the storage system for data recovery with different priorities; and instructions that cause the data processor to perform data recovery of the storage system at an occurrence of a failure involving one or more of the storage areas in the storage system based on the priorities. Data recovery for one storage area having a higher priority is to occur before data recovery for another storage area having a lower priority in the storage system.

These and other features and advantages of the present invention will become apparent to those of ordinary skill in the art in view of the following detailed description of the specific embodiments.

BRIEF DESCRIPTION OF THE DRAWINGS

FIG. 4 illustrates an example of the mapping information.

FIG. 5 illustrates an example of the pool information.

FIG. 16 illustrates an example of the access information regarding access for segments.

FIG. 19 illustrates an example of the access information for the conventional volume.

DETAILED DESCRIPTION OF THE INVENTION

Figure 1:
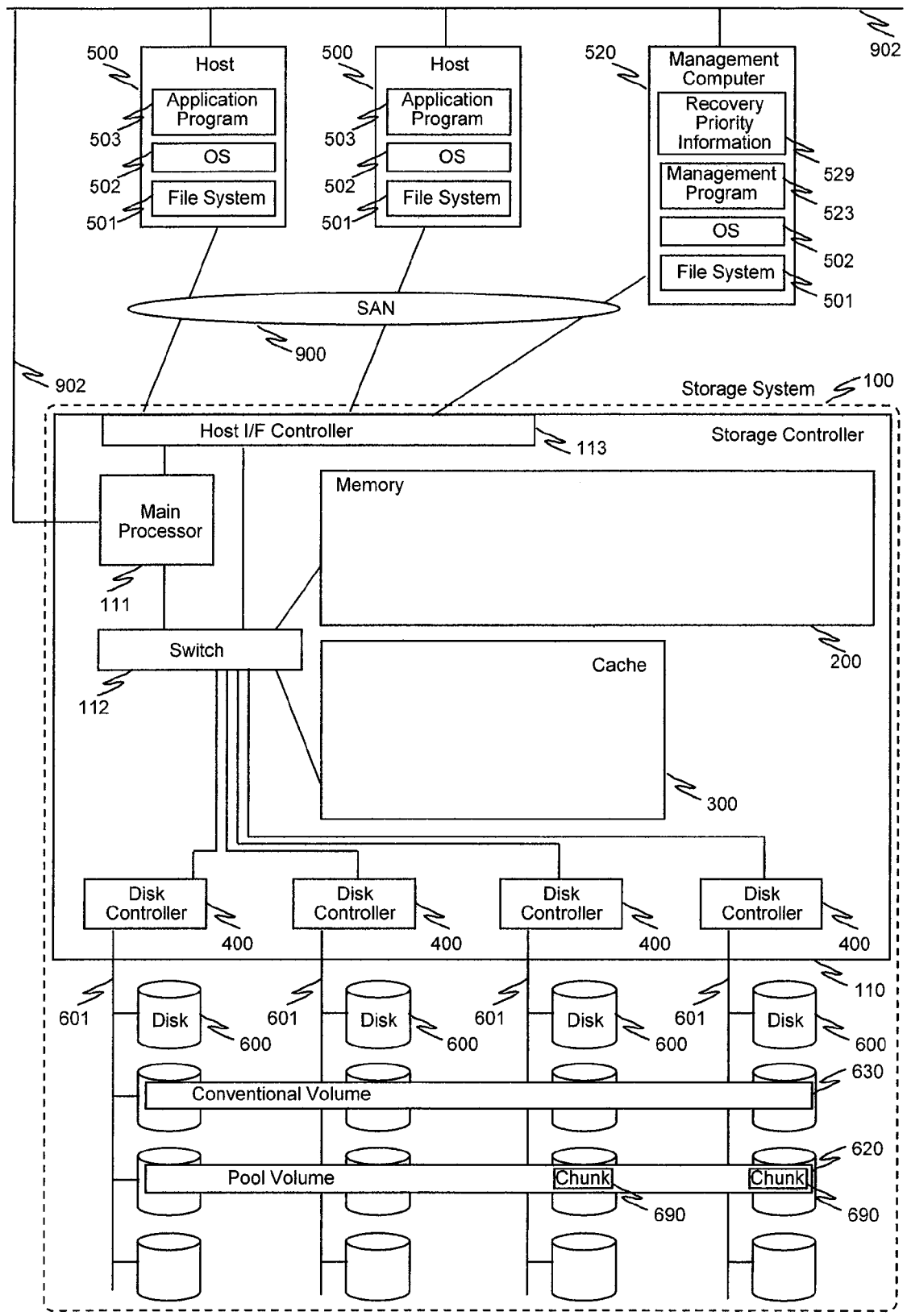
FIG. 1 illustrates an example of a hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for prioritizing the location of data to be recovered during failure which are particularly advantageous in large capacity disk drives.

According to exemplary embodiments, a method of the invention

A. System Configuration

FIG. 1 illustrates an example of a hardware configuration of a system in which the method and apparatus of the invention may be applied. A storage system 100 has a storage controller 110, a main processor 111, a switch 112, a host interface 113, a memory 200, a cache 300, a disk controller 400, a disk 600 (e.g., HDD and SSD), and backend path 601 (e.g., Fibre Channel, SATA, SAS, and iSCSI(IP)).

The main processor 111 performs various processes regarding the storage controller 110. The main processor 111 and other components use the following information stored in the memory 200 as shown in FIG. 2: mapping information 201, pool information 202, volume information 203, access information 204, segment group Information 205, internal volume information 206, parity group information 207, releasability information 208, and recovery priority information 209.

Figure 2:
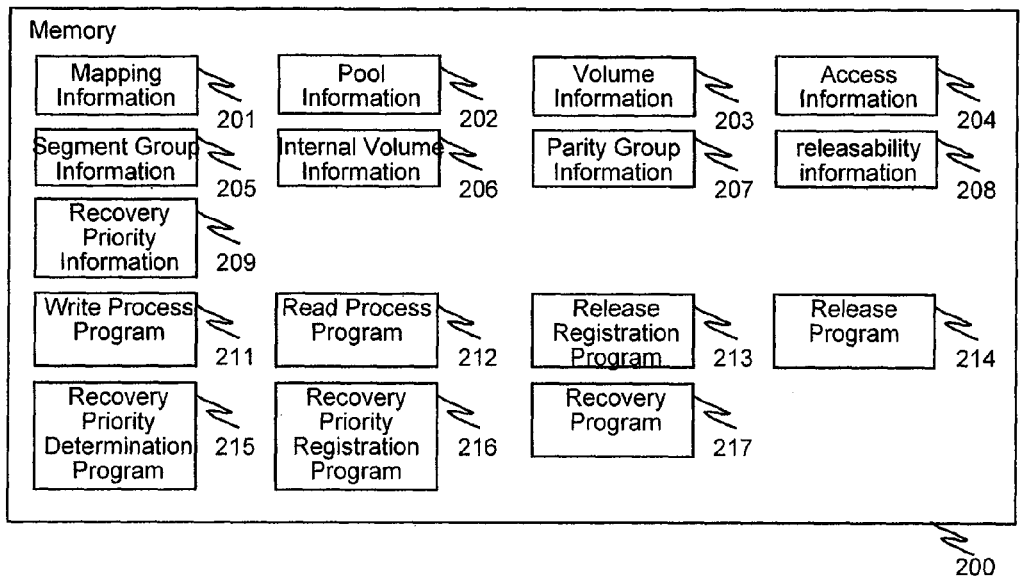
FIG. 2 illustrates an example of a memory in the storage system of FIG. 1.

The main processor 111 performs the processes by executing the following programs stored in memory 200 as shown in FIG. 2: write process program 211, read process program 212, release registration program 213, release program 214, recovery priority determination program 215, recover priority registration program 216, and recovery program 217. The details of these processes are described later.

The host 500 and management computer 520 are connected to the host interface 113 via the SAN 900 (e.g., Fibre Channel, Fibre Channel over Ethernet, and iSCSI(IP)). The host 500 and management computer 520 and storage controller 110 are connected with each other via the LAN 902 (e.g., IP network).

The host 500 has a file system 501, an operating system OS 502, and an application program 503. To run these programs, the host 500 also has resources such as processor, memory, storage devices not shown in FIG. 1.

The management computer 520 has a file system 501, an OS 502, and a management program 523. To run these programs, the management computer 520 also has resources such as processor, memory, storage devices not shown in FIG. 1. The management computer 520 maintains the recovery priority information 529 on the memory as described below.

B. Overview of Method for Providing Volumes

Figure 3:
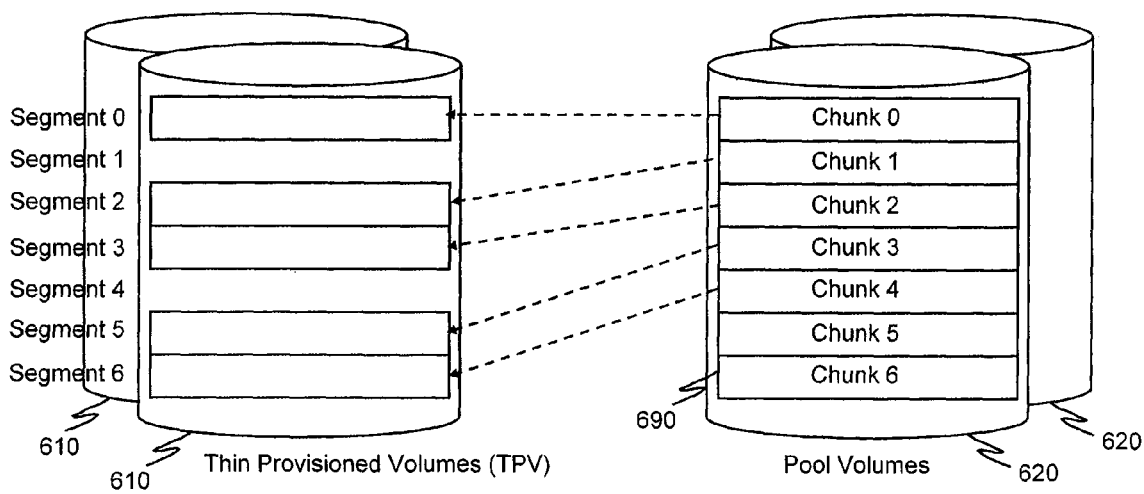
FIG. 3 illustrates the structure and method for providing thin provisioned volumes.

In one embodiment, the storage system 100 provides thin provisioned volumes (TPVs) 610 and conventional (not thin provisioned) volumes 630. Regarding these types of volumes, U.S. Pat. No. 7,162,600 to Kano discloses a storage system that provides conventional volumes and thin provisioned volumes. FIG. 3 illustrates the structure and method to provide TPVs 610. The storage system 100 has pool volumes 620 and divides the pool volumes 620 into a number of fixed-length areas called chunks 690. The storage system 100 assigns a chunk 690 to a segment of a virtual volume (TPV) on write access. In other words, the physical storage area is assigned on demand. In FIG. 3, a TPV 610 is constituted by multiple segments virtually, and a chunk 690 is allocated from the pool volume 620 and assigned to a segment (i.e., a fixed length area (page) of TPV 610). For example, the chunk 4 is assigned to the segment 6 in FIG. 3. That is, a TPV 610 is a page-based volume.

To achieve this, the storage controller 110 uses the mapping information 201 and pool information 202. FIG. 4 illustrates an example of the mapping information 201. This information maintains the mapping between chunks and segments of each volume. The status of assignation is "No" if no chunk is assigned to the segment. This information can be constructed as a list or a directory of each element for faster search.

FIG. 5 illustrates an example of the pool information 202. This information manages whether a chunk is used or not. By using this information, the storage controller 110 is able to find free (unused) chunks in the write process described below. This information also can be constructed as a list or directory of each element to search a free chunk quickly.

The storage system 100 also provides conventional volumes 630. The storage controller 110 allocates storage areas to the whole area of the conventional volume 630 at the creation of the volume as shown in FIG. 1. In order to manage the storage area for the conventional volumes 630, the storage controller 110 uses the volume information 203.

Figures 6, 7:
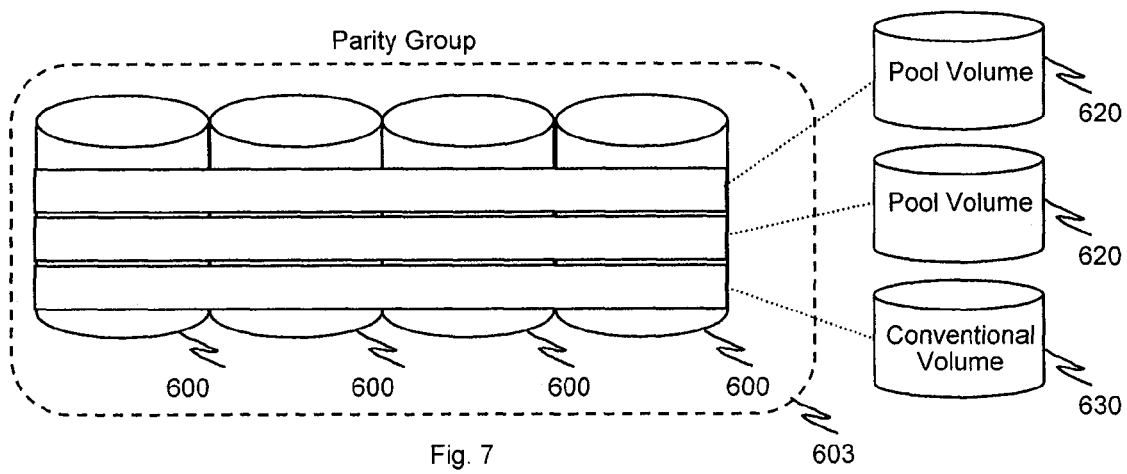
FIG. 6 illustrates an example of the volume information.
FIG. 7 illustrates an example of the relationship among disks, parity groups, pool volumes, and conventional volumes.

FIG. 6 shows an example of the volume information 203. This information includes the type (i.e., conventional or TPV), size, and public volume ID for each volume. This volume ID is used to recognize the volume by other computers including the host computers 500. With the internal volume ID, as described below, the storage controller 110 can recognize the relationship between the conventional volumes 630 and the parity groups 603 (see FIG. 7) by also referring to the internal volume information 206 and parity group information 207. The volume information 203 also maintains the relation (mapping) between the public volume ID and internal volume ID of a conventional volume 630.

The volume information 203 is also used to supply the TPVs 610 as data storage volumes provided by the storage system 100 to the host 500, by referring to the TPV ID. In other words, the volume information 203 maintains the relation (mapping) between the public volume ID and the TPV ID. The volume information 203 also includes information regarding the segment size of each volume of not only the TPV 610 but the conventional volume 630. That is, both the TPV and conventional volume have a fixed-length segment.

The segment size may be selectable and registered by the user via the host 500, the management computer 520, and/or the management terminal of the storage system 100.

C. Parity Groups and Data Protection

FIG. 7 illustrates the relationship among the disks 600, parity group 603, pool volumes 620, and conventional volumes 630. The parity group 603 is a collection of multiple physical storage disks 600. With the RAID technology, data and parity generated from the data are distributed among multiple disks 600 within the parity group 603. The parity group provides storage resources to store the data in a distributed manner. The storage area provided by the parity group is subdivided into volumes (i.e., conventional volumes 630 and pool volumes 620). Each of the conventional volumes 630 and a pool volume 620 can also include storage areas of multiple parity groups 603.

Figure 8:
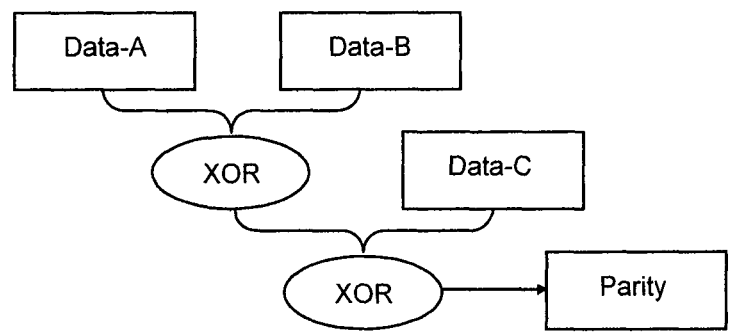
FIG. 8 illustrates an exemplary method for generating parity information.
Figure 9:
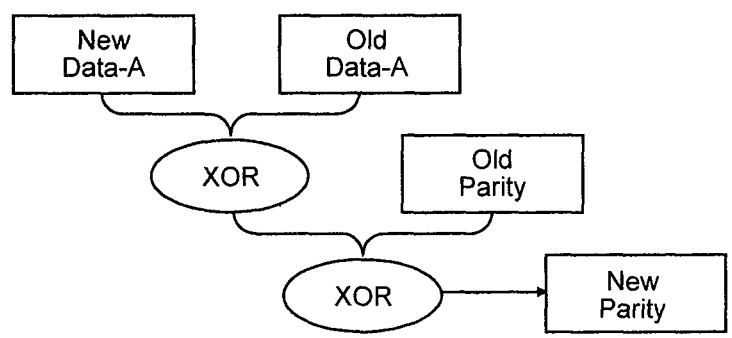
FIG. 9 illustrates an exemplary method for calculating a new parity value when the relevant date is updated.
Figure 10:
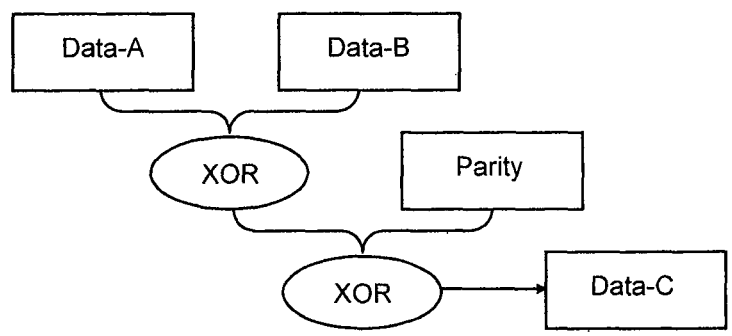
FIG. 10 illustrates an exemplary method for reconstructing a data stripe from the parity and the other data stripes.

FIGS. 8, 9, and 10 illustrate exemplary methods for generating parity and reconstructing data based on the RAID technology. Specifically, FIG. 8 illustrates an exemplary method for generating the parity information. Parity is generated by means of an XOR (exclusive OR) calculation, wherein Data-A, Data-B and Data-C are data sets (stripes) that generate one unit of parity and represent information units distributed to each disk in a single parity group. In particular, the parity is calculated using the formula: Data-A XOR Data-B XOR Data-C=Parity.

To maintain the above relationship between the data stored in the physical disks and the parity, the parity must be changed when the stored data is changed. FIG. 9 illustrates an exemplary method for calculating a new parity value when the relevant data is updated. The new parity value is obtained using the following calculation: new Data-A XOR old Data-A XOR old Parity=new Parity.

Because the above relationship between the data and the parity is always maintained, one data stripe can be reconstructed from the other data stripe and the parity value. That is, if a portion of the stored data is lost due to a failure of a disk in a parity group, the lost data stripe can be recovered. FIG. 10 illustrates an exemplary method for reconstructing a data stripe from the parity and the other data stripes. Specifically, Data-C can be reconstructed using the following calculation: Data-A XOR Data-B XOR Parity=Data-C. The storage systems configured in accordance with the RAID level 6 (RAID6) can recover the data even upon losing two data stripes because the RAID6 maintains two parity codes and distributes them to two different disks.

Moreover, data stored in disks 600 may be protected also by mirroring of the data (i.e., RAID1). With mirroring, in the recovery of data stored in a failed disk 600, data stored in disk 600 that forms a mirroring pair with the failed disk 600 is copied to another disk 600.

Figure 11:
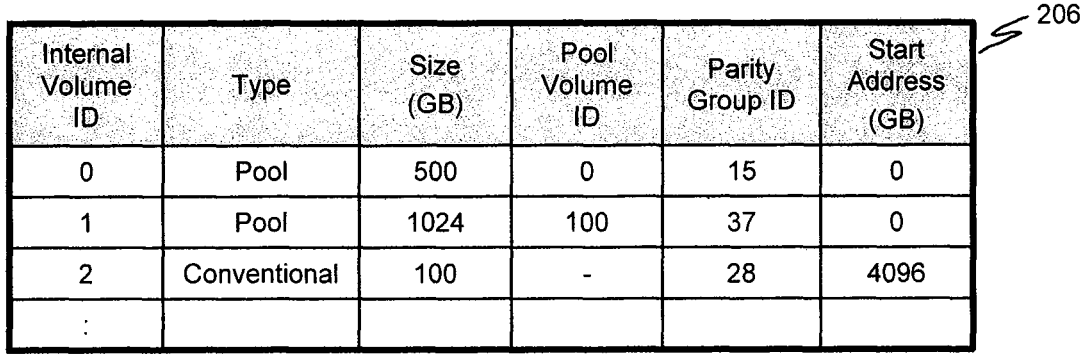
FIG. 11 illustrates an example of the internal volume information.
Figure 12:
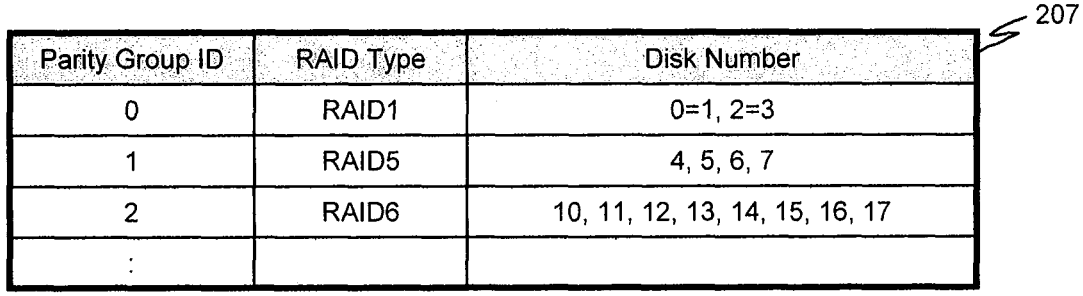
FIG. 12 illustrates an example of the parity group information.

To manage the above relationship among the disks 600, parity groups 603, and volumes, the storage controller 110 maintains the internal volume information 206 and parity group information 207. FIG. 11 shows an example of the internal volume information 206. This information indicates the relationship regarding how an area on parity groups 603 is assigned to each of the volumes (i.e., conventional volume 630 and pool volume 620). This information has the internal volume ID, type of each volume, size of each volume, parity group ID, and start address of the area for the volume. FIG. 12 shows an example of the parity group information 207. This information maintains the construction of each parity group 603 and type of data protection for the parity group 603. For example, parity group #0 is constructed by four disks 600 and secured with mirroring (i.e., RAID1). In the example, disk #0 and disk #1 make a mirroring pair and have the same data as well as a pair made with disk #2 and disk #3.

D. Overview of Write Process

Figure 13:
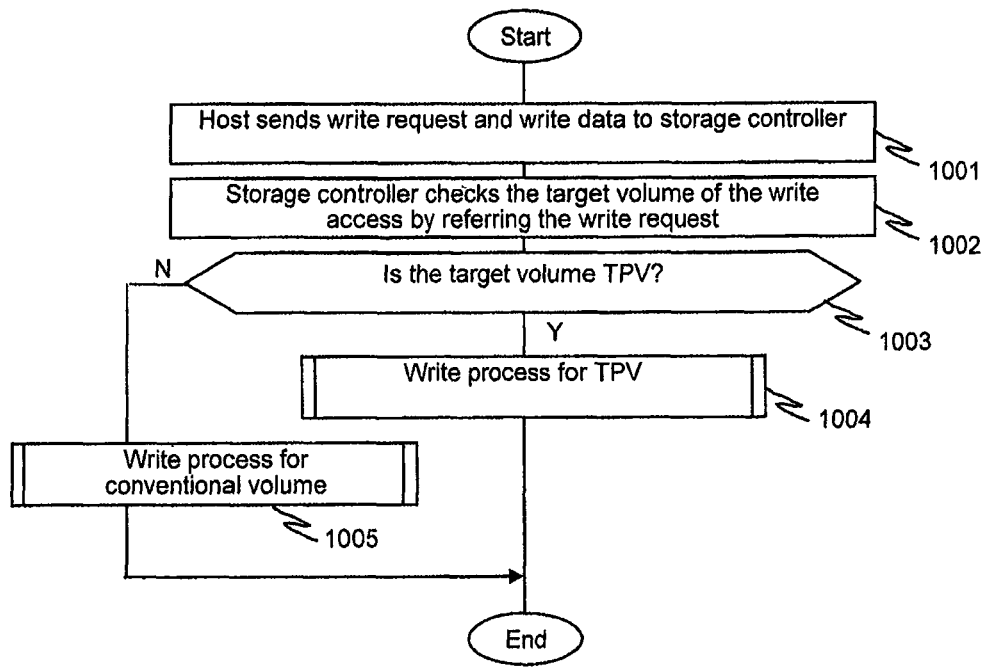
FIG. 13 is an example of a flow diagram illustrating an overview of a process for a write request from the host computer.

FIG. 13 is an example of a flow diagram illustrating an overview of a process for a write request from the host computer 500. At step 1001, the host 500 issues a write request and transfers write data to the storage controller 110. At step 1002, the storage controller 110 checks the target volume of the write access by referring to the write request. At step 1003, if the type of the target volume is TPV, the storage controller 110 performs a write process for TPV (step 1004). Otherwise, the storage controller 110 performs a write process for conventional volume (step 1005). Each of the detailed write processes is described below.

E. Overview of Read Process

Figure 14:
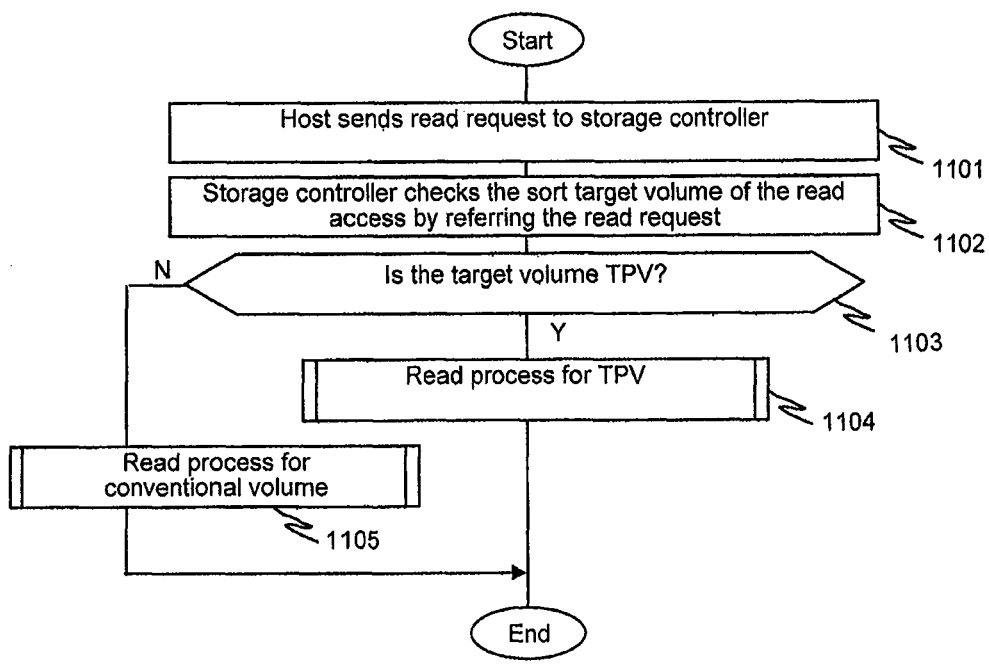
FIG. 14 is an example of a flow diagram illustrating an overview of a process for a read request from the host computer.

FIG. 14 is an example of a flow diagram illustrating an overview of a process for a read request from the host computer 500. At step 1101, the host 500 issues a read request to the storage controller 110. At step 1102, the storage controller 110 checks the target volume of the read access by referring to the read request. At step 1103, if the type of the target volume is TPV, the storage controller 110 performs a read process for TPV (step 1104). Otherwise, the storage controller 110 performs a read process for conventional volume (step 1105). Each of the detailed read processes is described below.

F. Write Process for TPV

Figure 15:
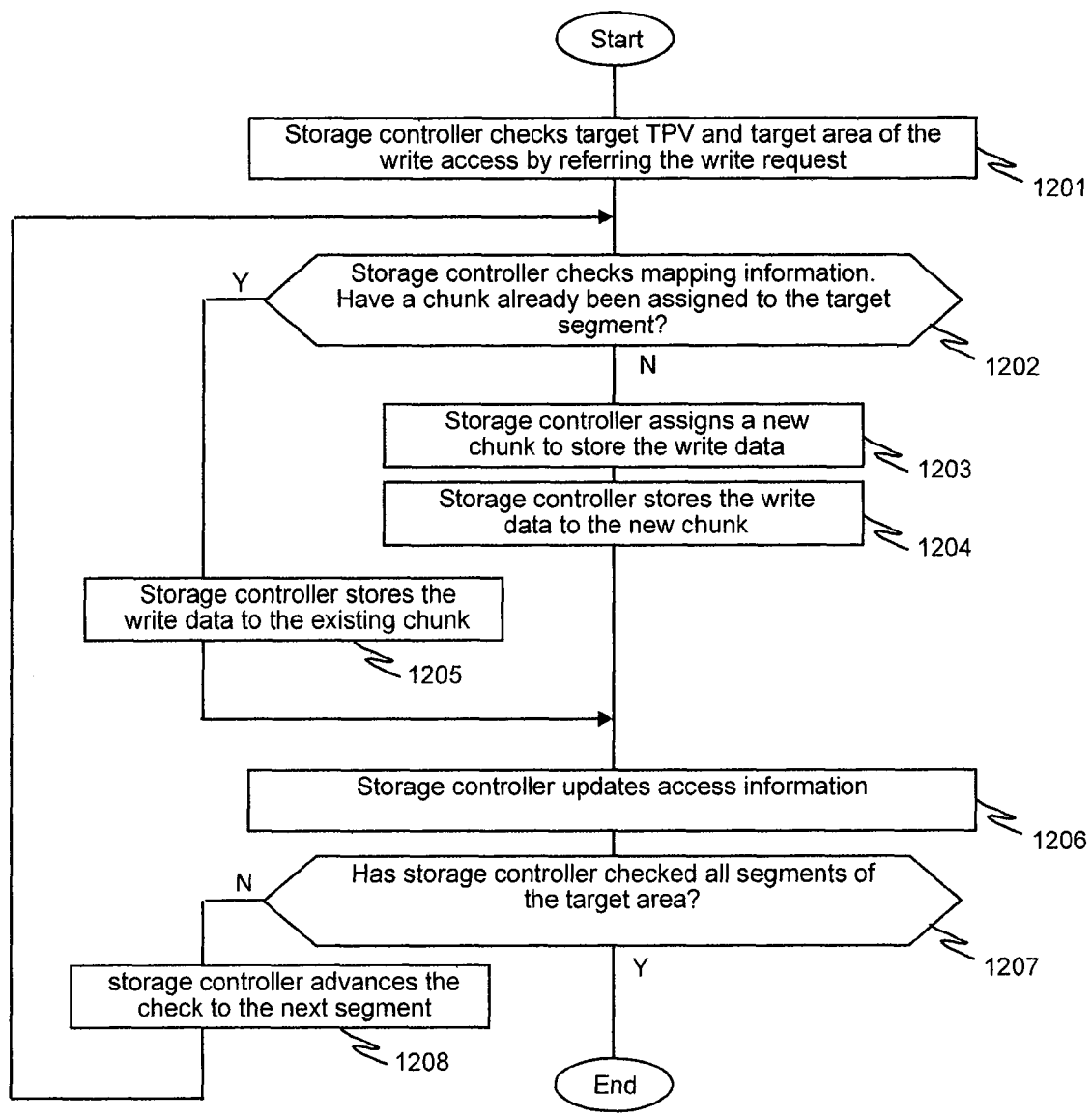
FIG. 15 is an example of flow diagram illustrating a write process for the thin provisioned volume.

FIG. 15 is an example of a flow diagram illustrating a write process for the TPV 610. At step 1201, the storage controller 110 checks the target TPV 610 and the target area of the write access by referring to the write request. At step 1202, the storage controller 110 checks the mapping information 201 for a segment in the target area. If a chunk has already been assigned to the segment, the process proceeds to step 1205. If not, the process proceeds to step 1203.

At step 1203 (a chunk has not been assigned), the storage controller 110 assigns a new chunk to store the write data. To do this, the storage controller 110 updates the mapping information 201 and pool information 202. By using the pool information 202, the storage controller 110 finds the new chunk from internal storage. At step 1204, the storage controller 110 stores the write data to the new chunk, and then the process proceeds to step 1206.

At step 1205 (a chunk has been assigned), the storage controller 110 stores the write data to the existing chunk.

At step 1206, the storage controller 110 updates the access information 204. This information records the access characteristics regarding the segment (i.e., page). At step 1207, if the storage controller 110 has checked all segments of the target area, the process ends. If not, the storage controller 110 advances the check to the next segment (step 1208).

FIG. 16 illustrates an example of the access information 204 regarding the access for the segments. As shown in FIG. 16, this maintains information regarding access to each segment group such as the access rate per unit time, last access time, and average access length, for each of read and write. A segment group is a collection of segment of the TPV and it is composed of a fixed number of contiguous segments. The number of segments in one segment number is defined in the segment group information 205 and can be selected by the users directly or via the management computer 520. When the value is set to one, a segment group becomes equivalent to a segment. Using a small number as the number of segments in a segment group realizes fine statistics while it increase the size of the memory to store the statistics. The information regarding the average access length may be initialized at a certain interval. By referring this information, the access frequency and access interval related to each segment group can be obtained.

G. Read Process for TPV

Figure 17:
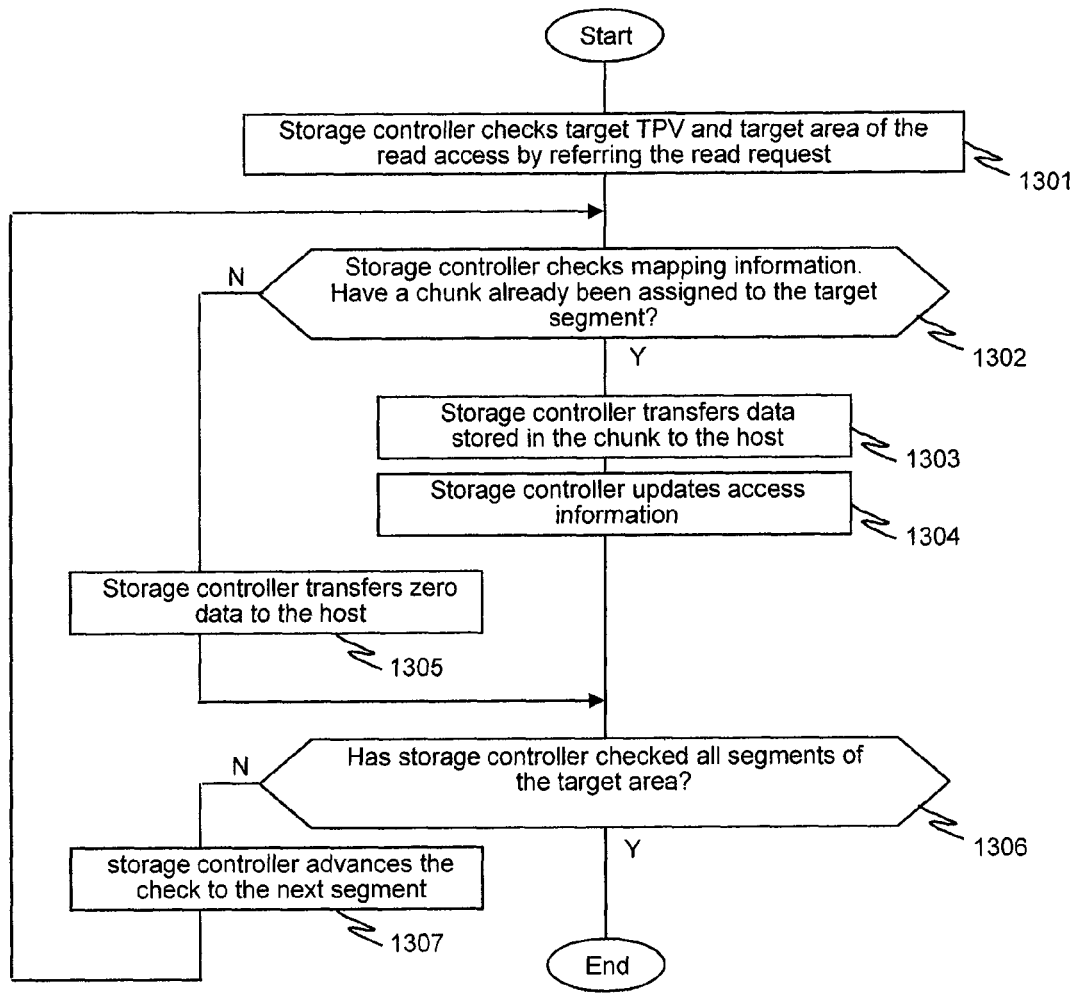
FIG. 17 is an example of a flow diagram illustrating a read process for the thin provisioned volume.

FIG. 17 is an example of a flow diagram illustrating a read process for TPV 610. At step 1301, the storage controller 110 checks the target TPV 610 and target area of the read access by referring to the read request. At step 1302, the storage controller 110 checks the mapping information 201 for a segment in the target area. If a chunk has already been assigned to the segment, the process proceeds to step 1303. If not, the process proceeds to step 1305.

At step 1303 (a chunk has been assigned), the storage controller 110 transfers data stored in the chunk to the host 500. At step 1304, the storage controller 110 updates the access information 204. At step 1305 (a chunk has not been assigned), the storage controller 110 sends data of zero (0) to the host 500. Finally, at step 1306, if the storage controller 110 has checked all segments of the target area, the process ends. If not, the storage controller 110 advances the check to the next segment (step 1307).

H. Write Process for Conventional Volume

According to embodiments of this invention, the access information 204 is recorded (i.e., access characteristics is monitored) also for the conventional volumes 630.

Figure 18:
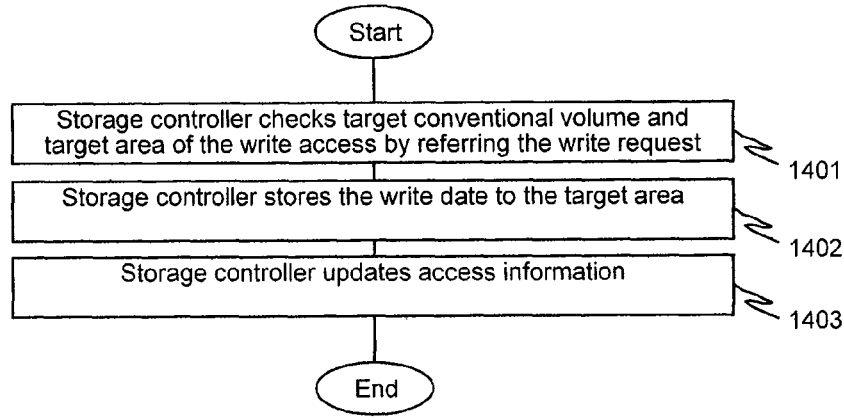
FIG. 18 is an example of a flow diagram illustrating a write process for the conventional volume.

FIG. 18 is an example of a flow diagram illustrating a write process for the conventional volume 630. At step 1401, the storage controller 110 checks the target conventional volume 630 and target area of the write access by referring to the write request. At step 1402, the storage controller 110 stores the write data to the target area of the write access. At step 1403, the storage controller 110 updates the access information 204.

FIG. 19 illustrates an example of the access information 204 for the conventional volume. This is the same as the access information 204 shown in FIG. 16 except for having the conventional volume ID and the conventional volume segment ID.

I. Read Process for Conventional Volume

Figure 20:
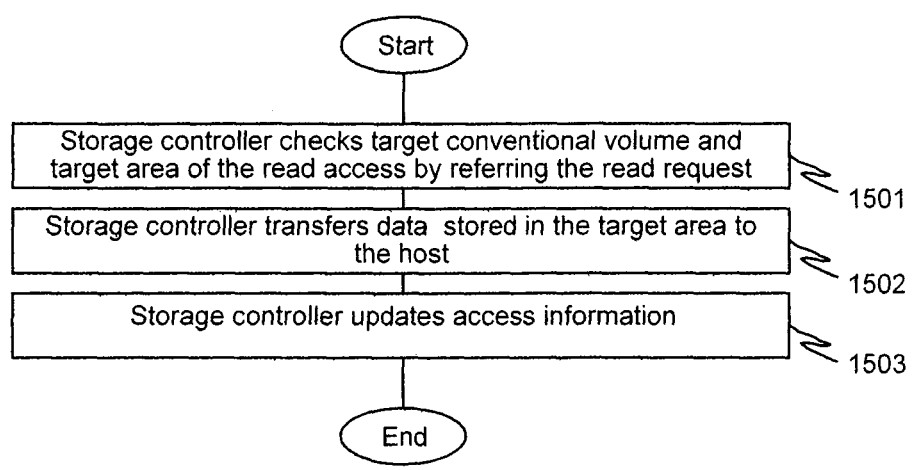
FIG. 20 is an example of a flow diagram illustrating a read process for the conventional volume.

FIG. 20 is an example of a flow diagram illustrating a read process for the conventional volume 630. At step 1501, the storage controller 110 checks the target conventional volume 630 and target area of the read access by referring to the read request. At step 1502, the storage controller 110 transfers data stored in the target area of the read access to the host 500. At step 1503, the storage controller 110 updates the access information 204.

J. Release Request Process for TPV

The host 500 can inform of no longer used areas (i.e., segments) to the storage system 100 and require reclaiming the chunks 690 from the segments.

Figures 21, 22:
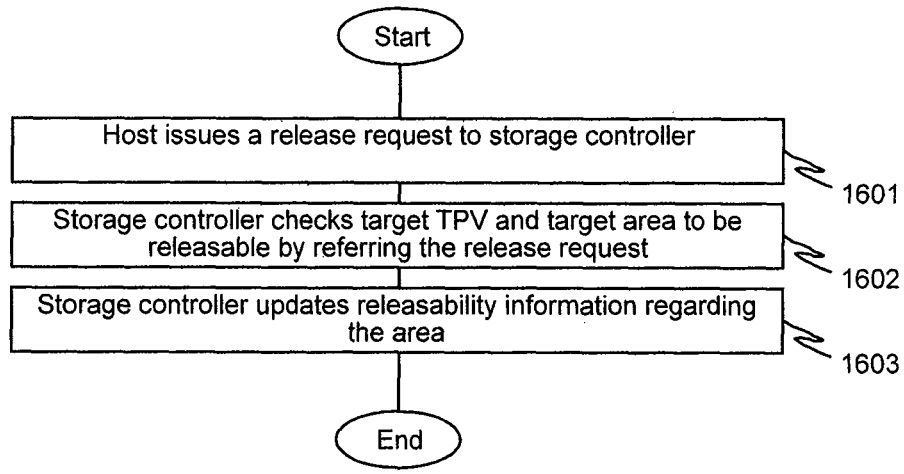
FIG. 21 is an example of a flow diagram illustrating a release request process for the thin provisioned volume.
FIG. 22 illustrates an example of the releasability information.

FIG. 21 is an example of a flow diagram illustrating a release request process for the TPV 610. At step 1601, the host 500 searches unused area of TPVs 610 and issues a release request to the storage controller 110. The above process of seeking unused segments may be performed by the file system 501 because the file system 501 can recognize the status of data storing and the usage of storage area in the TPVs 610. At step 1602, the storage controller 110 checks the target TPV 610 and target area to be released by referring to the received request. At step 1603, the storage controller 110 updates the releasability information 208 for the target area.

FIG. 22 illustrates an example of the releasability information 208. This information indicates the releasability of each segment. With the release request, the storage controller 110 changes "releasable" to "Yes" for the target area.

K. Process of Releasing Chunks of TPV

Figure 23:
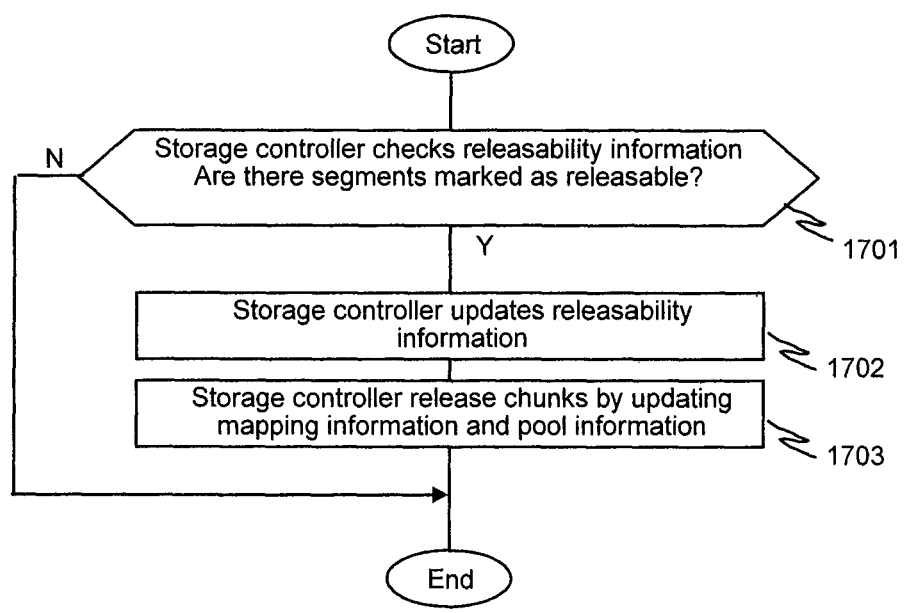
FIG. 23 is an example of a flow diagram illustrating a process of releasing chunks of the thin provisioned volume.

FIG. 23 is an example of a flow diagram illustrating a process of releasing chunks of the TPV 610. This process is repeated at a predetermined interval or performed when the load of the storage system 110 is low. At step 1701, the storage controller 110 checks the releasability information 208. If there are segments marked as releasable, the process proceeds to step 1702. If not, the process ends. At step 1702, the storage controller 110 updates the releasability information 208. The storage controller 110 changes "releasable" status to "No" for the segment having chunks 690 to be released. At step 1703, the storage controller 110 releases the chunks 690 from the above segments by updating the mapping information 201 and pool information 202.

L. Recovery Priority Determination Process

Figures 24, 25:
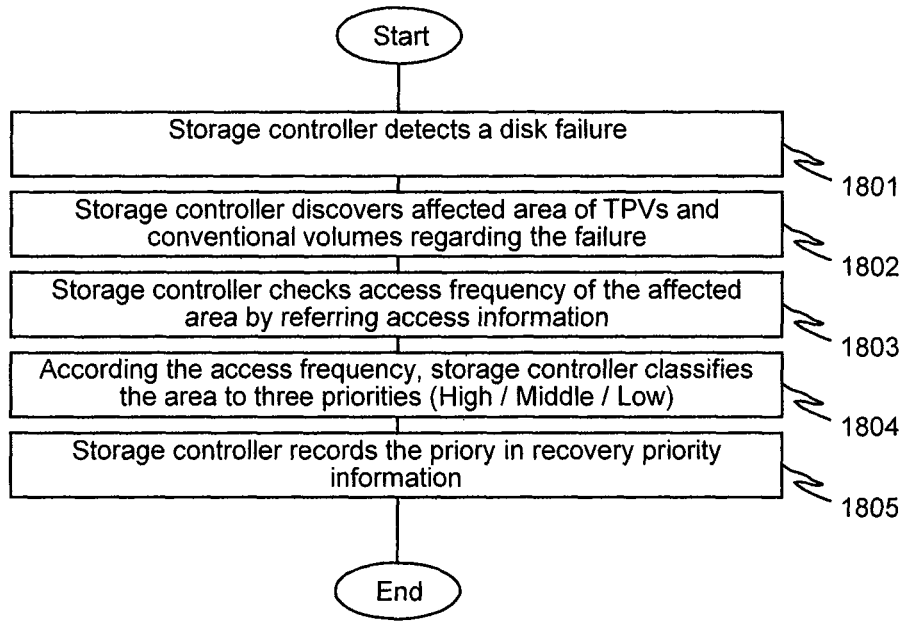
FIG. 24 is an example of a flow diagram illustrating a process to determine recovery priority of each area of the conventional volumes and thin provisioned volumes.
FIG. 25 illustrates an example of the recovery priority information.

FIG. 24 is an example of a flow diagram illustrating a process to determine recovery priority of each area of the conventional volumes 630 and TPVs 610. In this example, the priority is determined according to access characteristics such as access rate, frequency, and interval. At step 1801, the storage controller 110 detects a failure of a disk 600. At step 1802, the storage controller 110 finds the affected area of the TPVs 610 and conventional volumes 630 regarding the failure. The storage controller 110 can obtain the affected area by referring to the mapping information 201, internal volume information 206, and parity group information 207 in regard to the failed disk 600. At step 1803, the storage controller 110 checks the access information 204 for the affected area in order to obtain the access characteristics such as access frequency. At step 1804, the storage controller 110 classifies the area to several (e.g., three) priorities such as high, middle, and low according to the access characteristics. For example, the storage controller 110 obtains order (ranking) of access frequency for each area or segment group and separate them into the three classes. At step 1805, the storage controller 110 records the obtained priority in the recovery priority information 209.

FIG. 25 illustrates an example of the recovery priority information 209. In this example, the volume ID column shows the identifiers used in the volume information 203. As shown in FIG. 25, the areas in volumes including conventional volume 630 and TPV 610 are classified into multiple classes such as high priority group, middle priority group, and low priority group for the recovery process. In this example, an area having high access frequency has high priority and an area having low access frequency has low priority. Other factors of access characteristics can be used as another example of determining the priority. In regard to the manner to indicate an area, as another example, the segment ID or segment group ID can also be applied instead of using the start address and area length. As another example of method regarding the invention, access characteristics monitored by host 500 may be used to determine the priority.

M. Recovery Priority Registration Process for Performance Requirement

Figure 26:
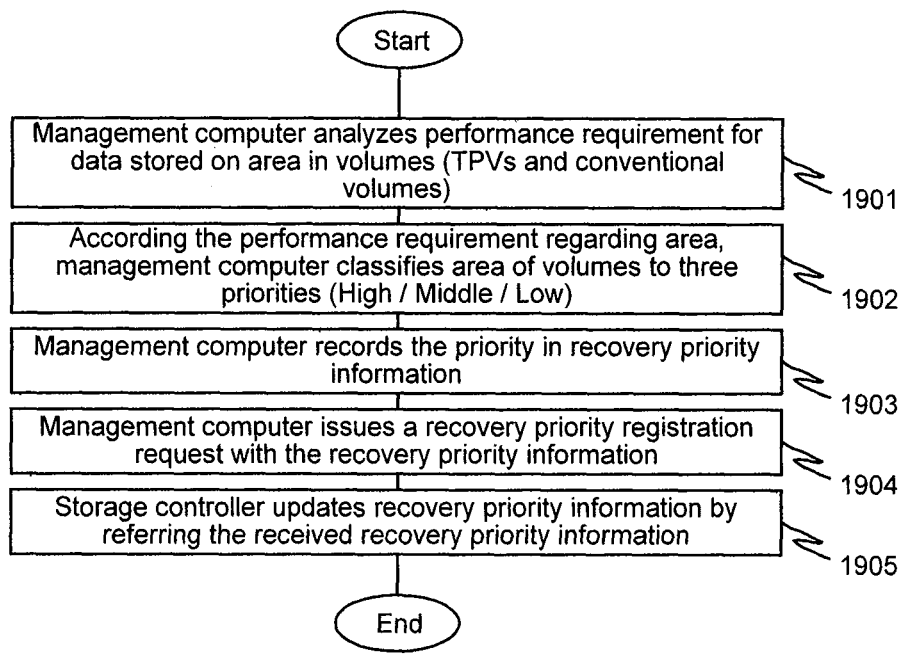
FIG. 26 is an example of a flow diagram illustrating a process for registration of recovery priority of each area of the volumes based on performance requirement.

As another method to obtain the priority or classification for recovery from a disk failure, registration of the priority from host 500 or management computer 520 can be performed. FIG. 26 is an example of a flow diagram illustrating a process for registration of recovery priority of each area of the volumes based on performance requirement. In this example, the host 500 or management computer 520 analyzes the performance requirement of each area of each volume. For example, the data of database application, especially index of data base, requires performance. The data of transaction application also requires performance. The host 500 or management computer 520 can assign high priority to the area storing such data. The host 500 or management computer 520 can evaluate the difference of performance requirement among multiple applications.

At step 1901, the management computer 520 analyzes the performance requirement for data stored on area in volumes. At step 1902, the management computer 520 obtains the location of the data and classifies the area into several (e.g., three) priorities such as high, middle, and low according to the analyzed difference of the performance requirement. At step 1903, the management computer 520 records the obtained priority in the recovery priority information 529. An example of the recovery priority information 209 as shown in FIG. 25 can also be applied for this information 529. At step 1904, the management computer 520 issues a recovery registration request to the storage controller 110. With this request, the content of the recovery priority information 529 is transferred to the storage controller 110. At step 1905, the storage controller 110 updates the recovery priority information 209 by referring to the received information. As another example, the management computer 520 may specify just the high priority area instead of multiple classes.

N. Recovery Priority Registration Process Based on Importance of Data

Figure 27:
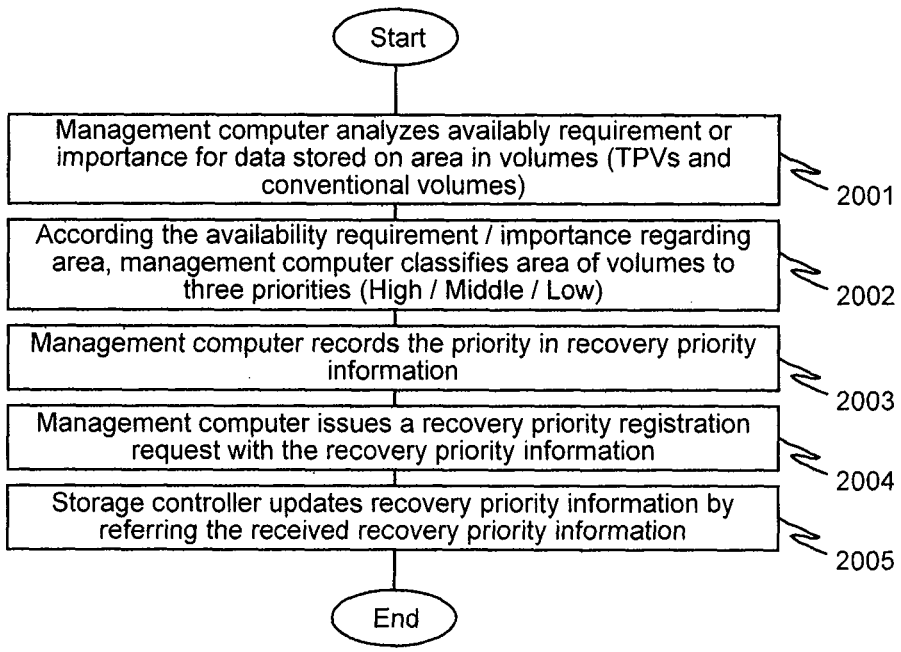
FIG. 27 is an example of a flow diagram illustrating a process for registration of recovery priority of each area of the volumes based on importance of data.

Another factor to consider is the importance of data. In other words, the priority may be evaluated based on the necessity to avoid loss of the data. FIG. 27 is an example of a flow diagram illustrating a process for registration of recovery priority of each area of the volumes based on importance of data. In this example, the host 500 or management computer 520 analyzes the importance of each area of each volume. For example, the metadata used by the file system 501, OS 502, and application program 503 is important because the loss of the metadata may cause the loss or unavailability of the whole data used by the software. The host 500 or management computer 520 can assign high priority to the area storing such data. In addition, from the user's viewpoint, most application programs 503 maintain both of important user data and unimportant data. That is, there is a difference of importance. The host 500 or management computer 520 can evaluate the difference of importance among multiple types of data maintained by multiple applications.

At step 2001, the management computer 520 analyzes the importance mentioned above for the data stored on area in volumes. At step 2002, the management computer 520 obtains the location of the data and classifies the area into several (e.g., three) priorities such as high, middle, and low according to the analyzed difference of importance or necessity to avoid loss of the data. At step 2003, the management computer 520 records the obtained priority in the recovery priority information 529. An example of the recovery priority information 209 as shown in FIG. 25 can also be applied for this information 529. At step 2004, the management computer 520 issues a recovery registration request to the storage controller 110. With this request, the content of the recovery priority information 529 is transferred to the storage controller 110. At step 2005, the storage controller 110 updates the recovery priority information 209 by referring to the received information. As another example, the management computer 520 may specify just the high priority area instead of multiple classes.

O. Recovery Priority Determination Based on Processes for TPV

Figure 28:
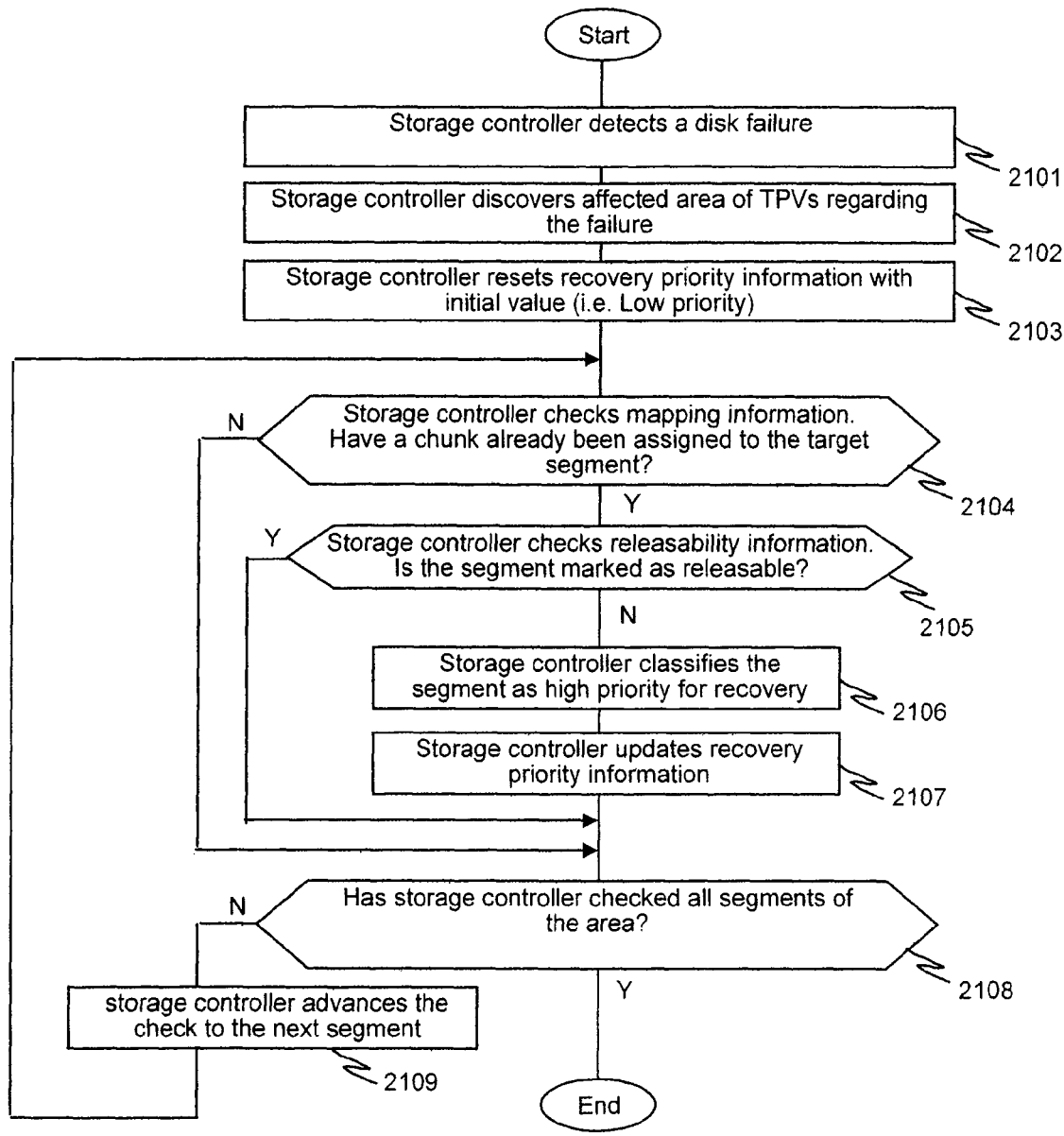
FIG. 28 is an example of a flow diagram illustrating a process to generate recovery priority of each area of the thin provisioned volumes based on area assignment/release (i.e., usage) of the thin provisioned volumes.

As described above, processes to provide TPVs 610 include the assignation and release request of the chunk 910. The information regarding the assignation process and the release process can be used to generate the recovery priority information 209. FIG. 28 is an example of a flow diagram illustrating a process to generate recovery priority of each area of the thin provisioned volumes based on area assignment/release (i.e., usage) of the thin provisioned volumes. By this process, areas that are expected to continue storing data acquire high priority for recovery from a disk failure.

At step 2101, the storage controller 110 detects a failure of a disk 600. At step 2102, the storage controller 110 finds the affected area of the TPVs 610 regarding the failure. The storage controller 110 can obtain the affected area by referring mapping information 201, internal volume information 206, and parity group information 207 in regard to the failed disk 600. At step 2103, the storage controller 110 resets the recovery priority information 209 to "Low" as the initial value. At step 2104, the storage controller 110 checks the mapping information 201 for a segment in the affected area. If a chunk has already been assigned to the segment, the process proceeds to step 2105. If not, the process proceeds to step 2108. At step 2105, the storage controller 110 checks the releasability information 208 for the segment. If the segment is marked as releasable, the process proceeds to step 2108. If not, the process proceeds to step 2106. At step 2106, the storage controller 110 classifies the area of the segment as high priority for recovery. At step 2107, the storage controller 110 records the obtained priority in the recovery priority information 209. At step 2108, if the storage controller 110 has checked all segments of the affected area, the process ends. If not, the storage controller 110 advances the check to the next segment (step 2109).

P. Recovery Process

Figure 29:
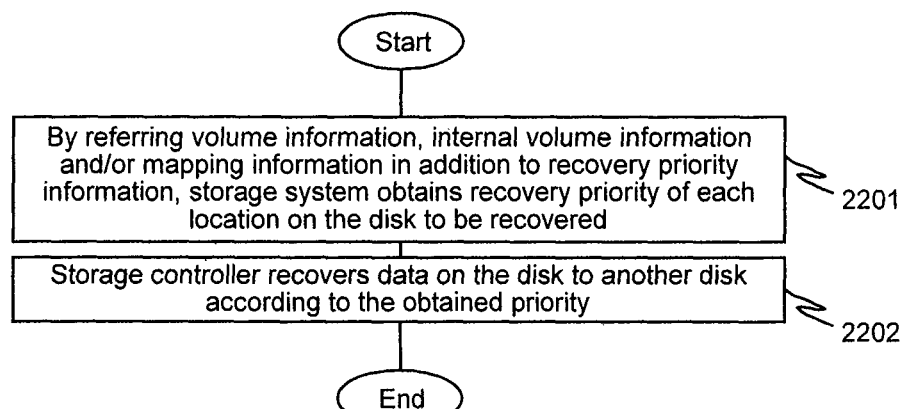
FIG. 29 is an example of a flow diagram illustrating a process for recovery from a disk failure according to the recovery priority.

FIG. 29 is an example of a flow diagram illustrating a process for recovery from a disk failure according to the recovery priority described above. At step 2201, the storage controller 110 obtains the recovery priority of each area on the disk 600 to be recovered. The storage controller 110 refers to the volume information 203, internal volume information 206, and/or mapping information 201 to recognize the location on the disk 600. The storage controller 110 also refers to the recovery priority information 209 to obtain the priority. At step 2202, the storage controller 110 recovers the data stored in the failed disk 600 to another disk 600 by using the aforesaid methods according to the obtained priority.

To achieve the recovery based on the priority, the storage controller 110 can allocate computing resource (e.g., processing time of main processor 111 and disk controller 400, memory 200, and bandwidth of backend paths 601) to each of the concurrent recovery processes for multiple locations according to the priority of each location. The storage controller 110 can also control execution order of recovery processes according to the priority. With the methods and processes described above, disk failure recovery methods that align to the users' applications and usage can be achieved.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for prioritizing the location of data to be recovered during failure which are particularly advantageous in large capacity disk drives. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a plurality of storage devices; and
a controller being operable to manage a plurality of storage areas, which are provided by using the plurality of storage devices, and a volume of a plurality of volumes which is allocated a storage area of the plurality of storage areas for storing data in accordance with receiving a write command to the volume and being operable to detect failure of a portion of the plurality of storage devices, and being operable, after detecting the failure, to find a plurality of allocated storage areas that are affected by the failure of the portion and to prioritize the plurality of allocated storage areas that are found to be affected by the failure of the portion with different priorities for a recovery process to the portion of the plurality of storage devices having the failure, based on information managed by the controller which relates to the allocated storage areas, wherein data stored in an allocated storage area, of the plurality of allocated storage areas that are found to be affected by the failure of the portion, having a higher priority is handled for the recovery process before data stored in another allocated storage area, of the plurality of allocated storage areas that are found to be affected by the failure of the portion, having a lower priority based on the priorities; and wherein the controller is operable to discover the plurality of allocated storage areas affected by the failure of the portion based on a location of the failure in the plurality of storage devices, first information indicating how an area on parity groups is assigned to each of the volumes, and second information indicating construction of each parity group of the parity groups from the plurality of storage devices, and is operable to prioritize the plurality of allocated storage areas based on the discovery.

2. The storage system according to claim 1:
wherein for a volume which is a thin provisioned volume, the controller is operable to prioritize the plurality of allocated storage areas based on area assignment and release of the thin provisioned volume using information regarding assignation process and information regarding release process for the thin provisioned volume.

3. The storage system according to claim 1:
wherein the controller is operable to perform the recovery process based on the priorities and parity value generated from the stored data as redundant information;
wherein the failure of the portion is detected on a failed disk; and
wherein data stored in an allocated storage area related to the portion having the failure on the failed disk is stored in another disk with no detected failure based on the recovery process.

4. The storage system according to claim 1:
wherein the controller is operable to discover the plurality of allocated storage areas affected by the failure of the portion, for a volume which is a thin provisioned volume, further based on mapping information mapping chunks of one or more storage pools and segments of the thin provisioned volume.

5. The storage system according to claim 1:
wherein the controller is operable to perform the recovery process based on the priorities and parity value generated from the stored data as redundant information, and
wherein data stored in an allocated storage area related to the portion having the failure is stored in another portion of the plurality of storage devices based on the recovery process.

6. The storage system according to claim 1:
wherein the controller is operable to manage a storage pool having the plurality of storage areas and to allocate the storage area from the storage pool to the volume in accordance with receiving the write command to the volume.

7. The storage system according to claim 1:
wherein the controller is operable to monitor access characteristics of the plurality of allocated storage areas, and to use the monitored access characteristics to prioritize the plurality of allocated storage areas after the failure is detected.

8. The storage system according to claim 7:
wherein the access characteristics comprise at least one of access frequency, access rate, or access interval.

9. The storage system according to claim 1:
wherein the different priorities are assigned based on at least one of usage or importance of data stored in each of the plurality of allocated storage areas.

10. The storage system according to claim 1:
wherein the controller is operable to control the plurality of allocated storage areas according to Redundant Arrays of Inexpensive Disks (RAID) technology, and to refer to information of the RAID for the plurality of allocated storage areas when the controller prioritizes the plurality of allocated storage areas.

11. A non-transitory machine-readable storage medium storing a computer program executed in a storage system comprising a plurality of storage devices and a controller managing the plurality of storage devices, the computer program comprising:
a code for managing a plurality of storage areas which are provided by using the plurality of storage devices;
a code for managing a volume of a plurality of volumes which is allocated a storage area of the plurality of storage areas for storing data in accordance with receiving a write command to the volume;
a code for detecting failure of a portion of the plurality of storage devices;
a code for, after detecting the failure, finding a plurality of allocated storage areas that are affected by the failure of the portion and prioritizing the plurality of allocated storage areas that are found to be affected by the failure of the portion with different priorities for a recovery process to the portion of the plurality of storage devices having the failure, based on information managed by the controller which relates to the allocated storage areas,
wherein data stored in an allocated storage area, of the plurality of allocated storage areas that are found to be affected by the failure of the portion, having a higher priority is handled for the recovery process before data stored in another allocated storage area, of the plurality of allocated storage areas that are found to be affected by the failure of the portion, having a lower priority based on the priorities; and
wherein the plurality of allocated storage areas affected by the failure of the portion are discovered based on a location of the failure in the plurality of storage devices, first information indicating how an area on parity groups is assigned to each of the volumes, and second information indicating construction of each parity group of the parity groups from the plurality of storage devices, and the plurality of allocated storage areas are prioritized based on the discovery.

12. The non-transitory machine-readable storage medium according to claim 11:
wherein the code for prioritizing, for a volume which is a thin provisioned volume, the plurality of allocated storage areas based on area assignment and release of the thin provisioned volume using information regarding assignation process and information regarding release process for the thin provisioned volume.

13. The non-transitory machine-readable storage medium according to claim 11, wherein the computer program further comprises:
a code for performing the recovery process based on the priorities and parity value generated from the stored data as redundant information;
wherein the failure of the portion is detected on a failed disk; and
wherein data stored in an allocated storage area related to the portion having the failure on the failed disk is stored in another disk with no detected failure based on the recovery process.

14. The non-transitory machine-readable storage medium according to claim 11,
wherein the plurality of allocated storage areas affected by the failure of the portion are discovered, for a volume which is a thin provisioned volume, further based on mapping information mapping chunks of one or more storage pools and segments of the thin provisioned volume.

15. The non-transitory machine-readable storage medium according to claim 11, wherein the computer program further comprises:
a code for performing the recovery process based on the priorities and parity value generated from the stored data as redundant information,
wherein data stored in an allocated storage area related to the portion having the failure is stored in another portion of the plurality of storage devices based on the recovery process.

16. The non-transitory machine-readable storage medium according to claim 11, wherein the computer program further comprises:
a code for managing a storage pool having the plurality of storage areas; and
a code for allocating the storage area from the storage pool to the volume in accordance with receiving the write command to the volume.

17. The non-transitory machine-readable storage medium according to claim 11, wherein the computer program further comprises:
a code for monitoring access characteristics of the plurality of allocated storage areas; and
a code for using the monitored access characteristics to prioritize the plurality of allocated storage areas after the failure is detected.

18. The non-transitory machine-readable storage medium according to claim 17:
wherein the access characteristics comprise at least one of access frequency, access rate, or access interval.

19. The non-transitory machine-readable storage medium according to claim 11:
wherein the different priorities are assigned based on at least one of usage or importance of data stored in each of the plurality of allocated storage areas.

20. The non-transitory machine-readable storage medium according to claim 11, wherein the computer program further comprises:
a code for controlling the plurality of allocated storage areas according to Redundant Arrays of Inexpensive Disks (RAID) technology; and
a code for referring to information of the RAID for the plurality of allocated storage areas when the controller prioritizes the plurality of allocated storage areas.

* * * * *